United States Patent [19]
Park et al.

[11] Patent Number: 6,154,578
[45] Date of Patent: *Nov. 28, 2000

[54] METHOD FOR MOTION COMPENSATION OF A MOVING IMAGE USING TWO DIMENSIONAL TRIANGLE PATCH WIREFRAME MODEL

[75] Inventors: Kye-ho Park, Suwon; Hak-soo Kim, Seoul, both of Rep. of Korea

[73] Assignee: Samsung Electronics Co., Ltd., Kynugki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/000,656

[22] Filed: Dec. 30, 1997

[30] Foreign Application Priority Data

Mar. 31, 1997 [KR] Rep. of Korea ...................... 97-11811

[51] Int. Cl.[7] ....................................................... G06K 9/32
[52] U.S. Cl. ........................................... 382/293; 382/107
[58] Field of Search ..................................... 382/293, 107, 382/236, 275, 241; 358/133; 348/700, 701

[56] References Cited

U.S. PATENT DOCUMENTS

| | | | |
|---|---|---|---|
| 5,117,287 | 5/1992 | Koike et al. | 358/133 |
| 5,654,771 | 8/1997 | Tekalp et al. | 382/241 |

FOREIGN PATENT DOCUMENTS

| | | | |
|---|---|---|---|
| 3-121688 | 5/1991 | Japan . | |
| 4-151988 | 5/1992 | Japan . | |
| WO 92/03799 A1 | 3/1992 | WIPO . | |
| WO 96/29828 A1 | 9/1996 | WIPO . | |

OTHER PUBLICATIONS

Super–low Bit Rate Moving Image Encoding Using Adaptive Warping Prediction, and Prediction of Non–Integral Pixel Interpolation, Technical Report of the IEICE, 96(2), pp. 33–40 (Apr. 12, 1996).

H. Li, P. Roivainen, R. Forchheimer, "3–D Motion Estimation in Model–Based Facial Image Coding", IEEE Transactions on Pattern Analysis and Machine Intelligence, vol. 15, No. 6, Jun. 1993, p. 545–555.

*Primary Examiner*—Yon J. Couso
*Attorney, Agent, or Firm*—Sughrue, Mion, Zinn, Macpeak & Seas, PLLC

[57] ABSTRACT

A method for compensating a motion of a moving image after estimating said motion is provided. In the method, a triangle-patch wireframe model is formed on a present frame of the moving image, and the triangle-patch wireframe model contains apexes. The motion vectors between the apexes of the triangle-patch wireframe model and corresponding points on a previous frame of the moving image is determined. The triangle-patch wireframe model on the present frame is transformed to form a transformed triangle-patch wireframe model on the previous frame by using the motion vectors such that the corresponding points respectively relate to secondary apexes of the transformed triangle-patch wireframe model. A first pixel value of a first pixel located at a predetermined position within the triangle-patch wireframe model of the present frame is replaced with a replacement pixel value of a second pixel located at a corresponding position within the triangle-patch wireframe model in the previous frame. Then, a new image is reconstructed using the replacement pixel value.

7 Claims, 3 Drawing Sheets

METHOD FOR MOTION COMPENSATION OF A MOVING IMAGE USING TWO DIMENSIONAL TRIANGLE PATCH WIREFRAME MODEL

FIELD OF THE INVENTION

The present invention relates to a method for performing a motion compensation operation on a moving image in order to reconstruct a new image. More particularly, the invention relates to a method for performing a motion compensation operation which uses pixels that are transformed by estimating the motion vector using a two-dimensional triangle-patch wireframe model.

BACKGROUND OF THE INVENTION

A motion estimation operation for a moving image is performed before a motion compensation operation for the moving image is performed. The motion estimation operation is performed by dividing the present frame of an input image into many small reference blocks and comparing each reference block with various search blocks contained in a previous frame. Then, the difference between the search blocks of the previous frame and each of the reference blocks of the present frame is calculated. In other words, the "difference degree" of the search blocks for each of the reference blocks is determined. The search block having the smallest difference degree for a particular reference block is deemed to be the matching block for the particular reference block. After all of the matching blocks have been determined for the reference blocks, the difference between the coordinates of each reference block and its corresponding matching block is determined, and a motion vector corresponding to such difference is estimated. Then, the present frame is encoded based on the difference between the values of the pixels of each matching block and the values of the corresponding pixels in the reference block identified by the corresponding motion vector. The encoded frame is reconstructed to the original image by combining each encoded pixel value and the corresponding pixel value of the corresponding matching block.

A conventional method for performing a motion compensation operation will be described in conjunction with FIG. 1. As shown in the figure, the present frame 10 comprises a plurality of reference blocks, and the previous frame 12 comprises a plurality of matching blocks that respectively correspond to the reference blocks. The motion vector of each matching block of the previous frame 12 is estimated for each reference block of the present frame 10. Then, the image of the present frame 10 is encoded by using the matching blocks of the previous frame 12 that correspond to the respective estimated motion vectors.

In the method above, the matching blocks in the previous frame 12 often overlap each other since the motion vectors of the matching blocks are calculated based on the reference blocks in the present frame 10 and the matching blocks in the previous frame 12 that have similar pixel values to pixel values of the reference blocks. Thus, the matching blocks of the previous frame 12 move to form the present frame 10. As a result, the picture quality of the image of a new frame is deteriorated since the portions of the image at the border of many of the matching blocks overlap and are cut.

SUMMARY OF THE INVENTION

An object of the present invention is to provide a method for performing a motion compensation operation on a moving image in order to reconstruct a new image.

Another object of the invention is to provide a method for performing a motion compensation operation which uses pixels that are transformed by estimating the motion vector using a two-dimensional triangle patch wireframe model.

In order to achieve the above and other objects, a method for compensating a motion of a moving image after estimating the motion is provided. The method comprising the steps of: (a) forming a triangle-patch wireframe model on a present frame of the moving image, wherein the triangle-patch wireframe model comprises apexes; (b) determining motion vectors between the apexes of the triangle-patch wireframe model and corresponding points on a previous frame of the moving image; (c) transforming the triangle-patch wireframe model on the present frame to form a transformed triangle-patch wireframe model on the previous frame by using the motion vectors such that the corresponding points respectively relate to secondary apexes of the transformed triangle-patch wireframe model; and (d) replacing a first pixel value of a first pixel located at a predetermined position within the triangle-patch wireframe model of the present frame with a replacement pixel value of a second pixel located at a corresponding position within the triangle-patch wireframe model in the previous frame.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

The following description of the preferred embodiments discloses specific configurations. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various features and structures of the present invention which would have been known to one skilled in the art are omitted for the sake of clarity and brevity.

Figure 1:
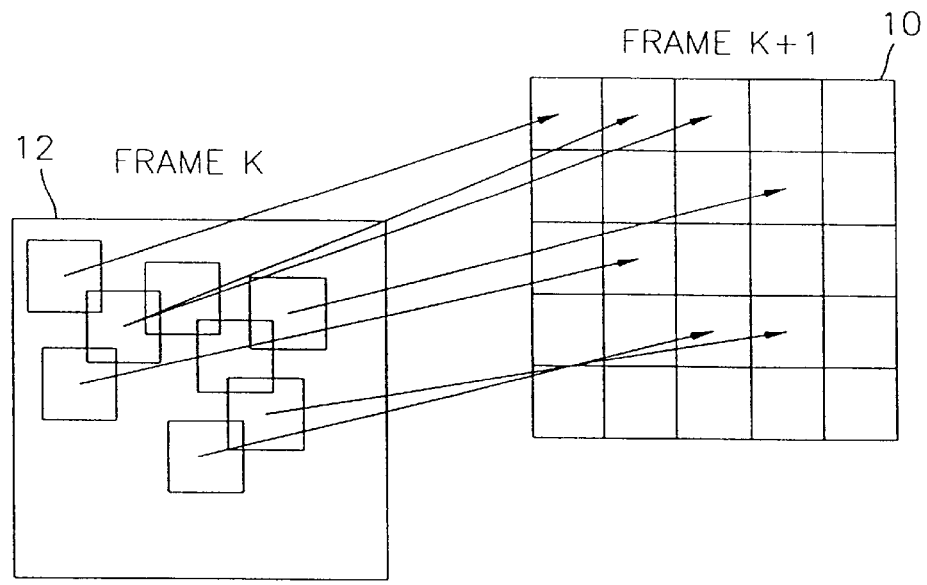
FIG. 1 is a diagram of the relationship between a previous frame and a present frame for explaining a conventional method for performing a motion compensation operation.
Figure 2:
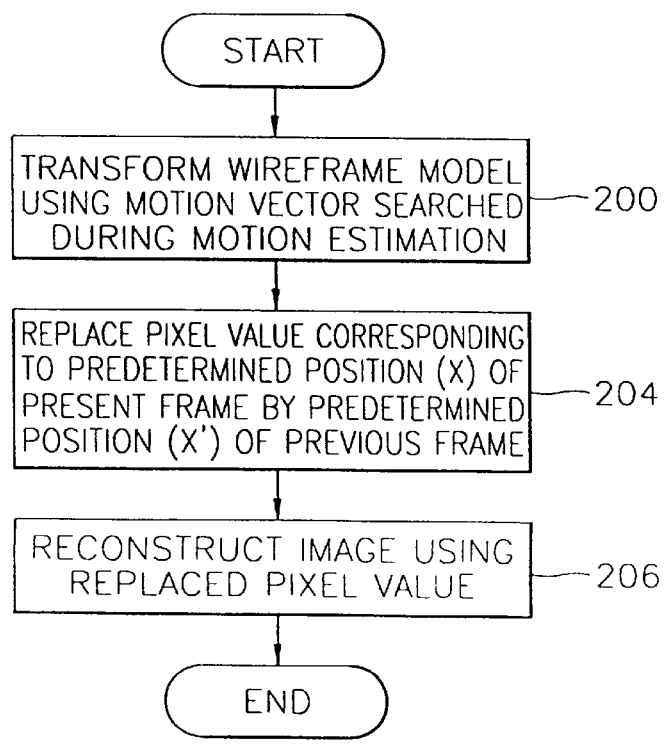
FIG. 2 explains a method for performing a motion compensation operation of a moving image in accordance with one embodiment of the present invention.

A method for compensating the motion of a moving image in accordance with one embodiment of the present invention is shown in FIG. 2. In the method, a wireframe model is transformed by using a motion vector calculated when the motion of the moving image was estimated (step 200). Then, the pixel value corresponding to a pixel located at a position X of the present frame is replaced with the pixel value of the pixel located at a corresponding position X' of the previous frame (step 204). Afterwards, a new image is reconstructed using the replaced pixel value (step 206). The steps of the method will be described in more detail below.

Figure 3A:
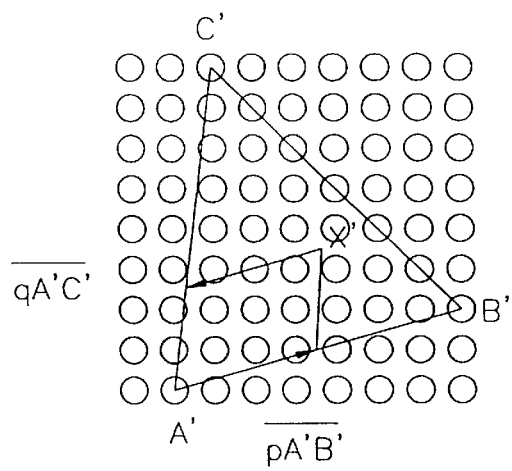
FIG. 3A illustrates a previous frame which is used for explaining a method for transforming a wireframe model based on a motion vector that was calculated during a motion estimation operation.
Figure 3B:
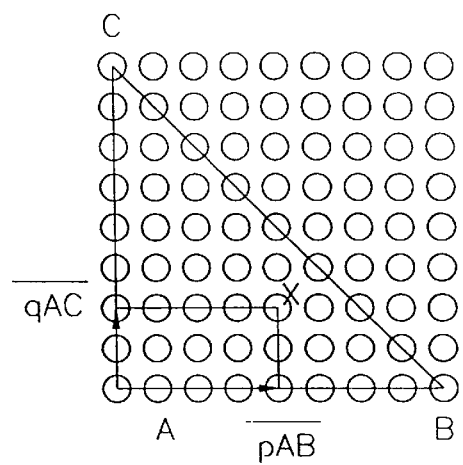
FIG. 3B illustrates a present frame which is used for explaining a method for transforming a wireframe model based on a motion vector that was calculated during a motion estimation operation.

In step 200, the wireframe model is transformed based on the motion vector calculated when the motion of the moving image was estimated (step 200). The transformation of the wireframe model will be described in conjunction with FIGS. 3A and 3B in which FIG. 3B corresponds to a present frame that is defined by a triangle and FIG. 3A corresponds to a previous frame. When the apexes of the triangle of the present frame are defined by the points A, B, and C, the apexes of the triangle of the previous frame which are transformed by the motion vectors between the present and previous frames are respectively defined by the points A', B' and C'. Also, an arbitrary pixel located at a position X in the triangle ABC in the present frame corresponds to a pixel located at a position X' in the triangle A'B'C' of the previous frame. The position vectors with respect to the apexes A, B, and C and the position X of the arbitrary pixel in the present frame are defined by Formula 1A.

$$A=(x_a,y_a),\ B=(x_b,y_b),\ C=(x_c,y_c),\ X=(x,y) \qquad \text{[Formula 1A]}$$

Similarly, the position vectors with respect to the apexes A', B', and C' and the position X' of the arbitrary pixel in the previous frame are defined by Formula 1B.

$$A'=(x_a',y_a'),\ B'=(x_b',y_b'),\ C'=(x_c',y_c'),\ X'=(x',y') \qquad \text{[Formula 1B]}$$

The position vectors of the arbitrary pixel position X' in the previous frame can also be represented by Formula 2A.

$$X'=A'+p\overline{A'B'}+q\overline{A'C'}=(x_a',y_a')+p(x_b'-x_a',y_b'-y_a')+q(x_c'-x_a',y_c'-y_a') \qquad \text{[Formula 2A]}$$

Similarly, the corresponding pixel position X in the present frame can also be represented by Formula 2B.

$$X=A+p\overline{AB}+q\overline{AC}=(x_a,y_a)+p(x_b-x_a,y_b-y_a)+q(x_c-x_a,y_c-y_a) \qquad \text{[Formula 2B]}$$

The difference between the pixel value of the pixel located at the position X of the present frame and the pixel value of the pixel located at the position X' of the previous frame can be represented by Formula 3.

$$X-X'=\begin{bmatrix}u\\v\end{bmatrix}=(1-p-q)\begin{bmatrix}u_a\\v_a\end{bmatrix}+p\begin{bmatrix}u_b\\v_b\end{bmatrix}+q\begin{bmatrix}u_c\\v_c\end{bmatrix} \qquad \text{[Formula 3]}$$

Formula 3 can be derived from Formulas 2A and 2B in the following manner.

$$X-X'=(A-A')+(B-B')+(C-C')$$
$$=(A-A')+p(\overline{AB}-\overline{A'B'})+q(\overline{AC}-\overline{A'C'})$$
$$=(x_a-x_a',y_a-y_a')+p(x_b-x_a,y_b-y_a)-$$
$$\quad p(x_b'-x_a',y_b'-y_a')+q(x_c-x_a,y_c-y_a)-$$
$$\quad q(x_c'-x_a',y_c'-y_a')$$
$$=(x_a-x_a',y_a-y_a')+(px_b-px_a,py_b-py_a)+$$
$$\quad (-px_b'+px_a',-py_b'+py_a')+(qx_c-qx_a,qy_c-qy_a)+$$
$$\quad (-qx_c'+qx_a',-qy_c'+qy_a')$$
$$=(x_a-x_a',y_a-y_a')+(-px_a+px_a',-py_a+py_a')+$$
$$\quad (px_b-px_b',py_b-py_b')+(-qx_a+qx_a',-qy_a+qy_a')+$$
$$\quad (qx_c-qx_c',qy_c-qy_c')$$
$$=(x_a-x_a',y_a-y_a')-p(x_a-x_a',y_a-y_a')+$$
$$\quad p(x_b-x_b',y_b-y_b')-q(x_a-x_a',y_a-y_a')+$$
$$\quad q(x_c-x_c',y_c-y_c')$$
$$=(1-p-q)(x_a-x_a',y_a-y_a')+$$
$$\quad p(x_b-x_b',y_b-y_b')+q(x_c-x_c',y_c-y_c')$$
$$=(1-p-q)\begin{bmatrix}x_a-x_{a'}\\y_a-y_{a'}\end{bmatrix}+p\begin{bmatrix}x_b-x_{b'}\\y_b-y_{b'}\end{bmatrix}+q\begin{bmatrix}x_c-x_{c'}\\y_c-y_{c'}\end{bmatrix}$$
$$=(1-p-q)\begin{bmatrix}u_a\\v_a\end{bmatrix}+p\begin{bmatrix}u_b\\v_b\end{bmatrix}+q\begin{bmatrix}u_c\\v_c\end{bmatrix}$$

wherein,
$u=x-x',\ v=y-y'$
$u_a=x_a-x_a',\ v_a=y_a-y_a'$
$u_b=x_b-x_b',\ v_b=y_b-y_b'$
$u_c=x_c-x_c',\ v_c=y_c-y_c'$
$p=((x-x_a)v_{y1}-(y-y_a)v_{x1})/(v_{x0}v_{y1}-v_{x1}v_{y0})$
$q=((y-y_a)v_{x0}-(x-x_a)v_{y0})/(v_{x0}v_{y1}-v_{x1}v_{y0})$
$v_{x0}=x_b-x_a,\ v_{y0}=y_b-y_a,\ v_{x1}=x_c-x_a,\ v_{y1}=y_c-y_a$
$0\leq p\leq 1,\ 0\leq q\leq 1,\ 0\leq p+q\leq 1$ As described above, the motion vectors which correspond to the movement of the respective apexes of the triangle from the previous frame to the present frame are $(u_a,v_a)$, $(u_b,v_b)$, and $(u_c,v_c)$. Also, the position vectors for an arbitrary pixel that exists inside the triangle of the previous frame is X'=(x',y'), and the position vector for the arbitrary pixel in the present frame is X=(x,y). The motion vector which corresponds to the movement of the arbitrary pixel from the previous frame to the present frame is X−X' which equals $$X-X'=\begin{bmatrix}u\\v\end{bmatrix}=(1-p-q)\begin{bmatrix}u_a\\v_a\end{bmatrix}+p\begin{bmatrix}u_b\\v_b\end{bmatrix}+q\begin{bmatrix}u_c\\v_c\end{bmatrix} \qquad \text{[Formula 3]}$$

The pixel value corresponding to the position pixel located at the position X of the present frame, which is obtained by the motion vector calculated from the Formula 2, is replaced by the pixel value of the pixel located at the position X' of the previous frame (step 204). In the situation in which the calculated position X' is not an integer, the pixel value of the pixel located at the position X' is determined by using bilinear interpolation.

Figure 4:
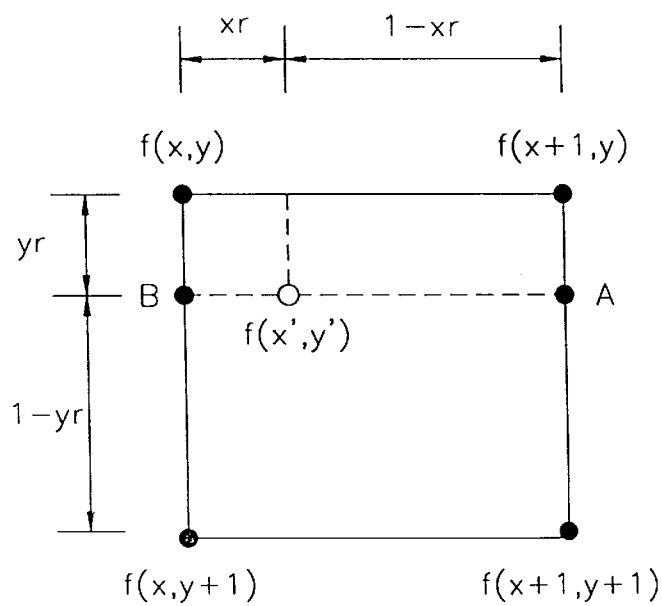
FIG. 4 illustrates an example of a manner in which bilinear interpolation is applied to an embodiment of the present invention.

An illustrative example of the manner in which bilinear interpolation is applied to the present embodiment will be described below in conjunction with FIG. 4. In the figure, a pixel f(x',y') of the previous frame is located at a position (x',y'). If the position (x',y') of the pixel f(x',y') to be replaced is not an integer number, the pixel value of the position (x',y') is determined by the pixel values of the integer locations around the position (x',y') using bilinear interpolation. In particular, the coordinate value of a point A is f(x+1,y)*(1−yr)+f(x+1,y+1)*yr, and the coordinate value of a point B is f(x,y)*(1−yr)+f(x,y+1)*yr. By obtaining the coordinate values of the points A and B, the pixel value of the pixel f(x',y') can be represented by Formula 4.

$$f(x',y')=B*(1-xr)+A*xr=(1-xr)\{(1-yr)f(x,y)+yrf(x,y+1)\}+xr\{(1-yr)f(x+1,y)+yrf(x+1,y+1)\} \quad \text{[Formula 4]}$$

As a result, a new image may be reconstructed by replacing the value of the pixel f(x',y') with the replaced pixel value calculated by the formula 4 (step 206). The pixel values of the image for which motion is compensated are obtained by applying the formula 4 to all of the pixels in all the triangle patches as mentioned above.

Figure 5A:
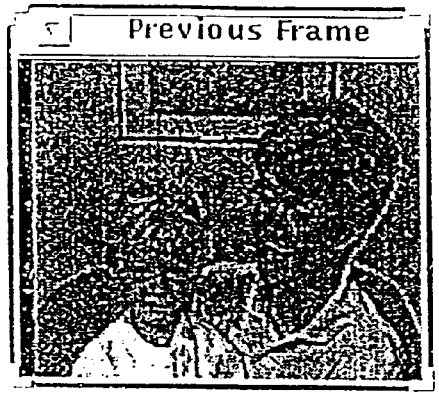
FIG. 5A shows an example of a previous frame which is subjected to the method for performing a motion compensation operation in accordance with the present invention.
Figure 5B:
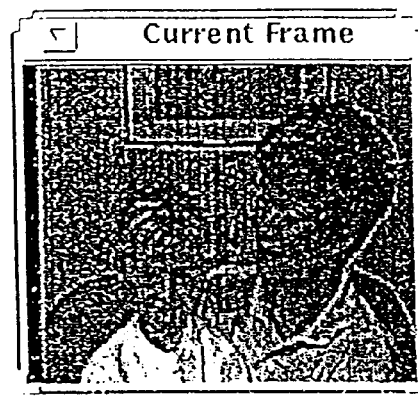
FIG. 5B shows an example of a present frame which is subjected to the method for performing a motion compensation operation in accordance with the present invention.
Figure 5C:
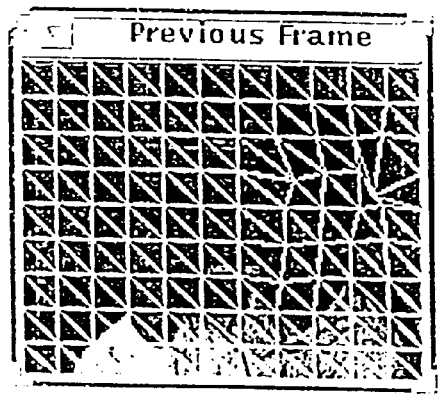
FIG. 5C shows a two-dimensional triangle-patch wireframe model that has been transformed after the motion between the previous and present frames shown in FIGS. 5A and 5B has been estimated.
Figure 5D:
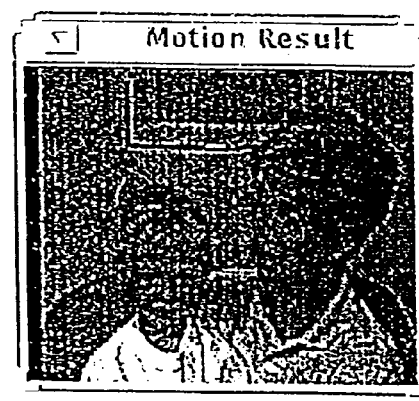
FIG. 5D shows the image after it has been subjected to the motion compensation operation.

FIGS. 5A to 5D illustrate an example of the application of the method for performing a motion compensation operation in accordance with the present invention. FIG. 5A shows the image of a previous frame, and FIG. 5B shows the image of the present frame. FIG. 5C shows a two-dimensional triangle-patch wireframe model that has been transformed after the motion between the previous and present frames has been estimated, and FIG. 5D shows the image after it has been subjected to the motion compensation operation. As shown in FIG. 5D, no discontinuity of the image exists between the blocks of the image in contrast to the discontinuity which is typically generated via conventional compensation methods. Therefore, the method for performing motion compensation in accordance with the present embodiment is able to dramatically increase the quality of the resultant picture.

Obviously, the embodiments described above are merely illustrative, and modifications of such embodiments may occur to those skilled in the art. Accordingly, this invention is not to be regarded as limited to the embodiments disclosed herein, but is to be limited only as defined by the appended claims.

What is claimed is:

1. A method for compensating a motion of a moving image after estimating said motion, comprising the steps of:
   (a) forming a symmetrical triangle-patch wireframe model on a present frame of said moving image, wherein said symmetrical triangle-patch wireframe model comprises apexes;
   (b) calculating apex motion vectors between said apexes of said symmetrical triangle-patch wireframe model and corresponding points on a previous frame of said moving image;
   (c) transforming said symmetrical triangle-patch wireframe model on said present frame to form a transformed triangle-patch wireframe model on said previous frame based on said apex motion vectors such that said corresponding points respectively relate to secondary apexes of said transformed triangle-patch wireframe model; and
   (d) replacing a first pixel value of a first pixel located at a predetermined position within said symmetrical triangle-patch wireframe model of said present frame with a replacement pixel value of a second pixel located at a corresponding position within said transformed triangle-patch wireframe model in said previous frame, based on a pixel motion vector between said predetermined pixel position and said corresponding pixel position, wherein said pixel motion vector is calculated in terms of said apex motion vectors.

2. The method as claimed in claim 1, wherein said replacement pixel value is determined by bilinear interpolation when said corresponding position of said first pixel is not an integer value.

3. The method as claimed in claim 1, further comprising the step of:
   (e) reconstructing a new image using said replacement pixel value.

4. The method as claimed in claim 1, wherein said first pixel is located within a reference block of said present frame and said second pixel is located in a matching block of said previous frame,
   wherein said reference block comprises a first group of pixels in said present frame and said matching block comprises a second group of pixels in said previous frame, and
   wherein pixel values of said second group of pixels correspond more closely to pixel values of said first group of pixels than any other pixel values of remaining groups of pixels in said previous frame.

5. A method for compensating a motion of a moving image after estimating said motion, comprising the steps of:
   (a) forming a triangle-patch wireframe model on a present frame of said moving image, wherein said triangle-patch wireframe model comprises apexes;
   (b) determining motion vectors between said apexes of said triangle-patch wireframe model and corresponding points on a previous frame of said moving image;
   (c) transforming said triangle-patch wireframe model on said present frame to form a transformed triangle-patch wireframe model on said previous frame by using said motion vectors such that said corresponding points respectively relate to secondary apexes of said transformed triangle-patch wireframe model; and
   (d) replacing a first pixel value of a first pixel located at a predetermined position within said triangle-patch wireframe model of said present frame with a replacement pixel value of a second pixel located at a corresponding position within said transformed triangle-patch wireframe model in said previous frame,
   wherein said apexes of said triangle-patch wireframe model comprise apex A, apex B, and apex C and position vectors of said apex A, said apex B, and said apex C respectively equal $(x_a, y_a)$, $(x_b, y_b)$, $(x_c, y_c)$,
   wherein said predetermined position X of said first pixel has a position vector $(x,y)$,
   wherein said secondary apexes of said transformed triangle-patch wireframe model comprise apex A', apex B', and apex C' and position vectors of said apex A', said apex B', and said apex C' respectively equal $(x'_a, y'_a)$, $(x'_b, y'_b)$, $(x'_c, y'_c)$,
   wherein said corresponding position X' of said second pixel has a position vector $(x',y')$, and
   wherein a motion vector between said predetermined position X and said corresponding position X' equals $$(1-p-q)(x_a-x'_a, y_a-y'_a)+p(x_b-x'_b, y_b-y'_b)+q(x_c-x'_c, y_c-y'_c),$$

wherein p equals $((x-x_a)v_{y1}-(y-y_a)v_{x1})/(v_{x0}v_{x1}-v_{x1}v_{y0})$, q equals $((y-y_a)v_{x0}-(x-x_a)v_{y0})/(v_{x0}v_{y1}-v_{x1}v_{y0})$, $v_{x0}$ equals $x_b-x_a$, $v_{y0}$ equals $y_b-y_a$, $v_{x1}$ equals $x_c-x_a$, and $v_{y1}$ equals $y_c-y_a$, and wherein $0 \leq p \leq 1$, $0 \leq q \leq 1$, and $0 \leq p+q \leq 1$.

6. The method as claimed in claim 5, further comprising the step of:

(e) reconstructing a new image using said replacement pixel value.

7. The method as claimed in claim 6, wherein said replacement pixel value is determined by bilinear interpolation when said corresponding position of said first pixel is not an integer value.

* * * * *